(12) United States Patent
Altshuler

(10) Patent No.: US 11,934,018 B2
(45) Date of Patent: Mar. 19, 2024

(54) APPARATUS, METHOD AND STORAGE MEDIUM FOR CONCENTRIC ALIGNMENT OF CYLINDRICAL COMPONENTS

(71) Applicant: Canon U.S.A., Inc., Melville, NY (US)

(72) Inventor: Alexander Altshuler, Cambridge, MA (US)

(73) Assignee: Canon U.S.A., Inc., Melville, NY (US)

( * ) Notice: Subject to any disclaimer, the term of this patent is extended or adjusted under 35 U.S.C. 154(b) by 527 days.

(21) Appl. No.: 17/095,599

(22) Filed: Nov. 11, 2020

(65) Prior Publication Data

US 2021/0149122 A1    May 20, 2021

Related U.S. Application Data

(60) Provisional application No. 62/936,275, filed on Nov. 15, 2019.

(51) Int. Cl.
   *G02B 6/38* (2006.01)
(52) U.S. Cl.
   CPC .......... *G02B 6/3834* (2013.01); *G02B 6/385* (2013.01); *G02B 6/3861* (2013.01)
(58) Field of Classification Search
   CPC ..... G02B 6/3861; G02B 6/385; G02B 6/3834
   See application file for complete search history.

(56) References Cited

U.S. PATENT DOCUMENTS

2017/0285276 A1* 10/2017 Altshuler ............. G02B 6/3861
2019/0321922 A1* 10/2019 Bookbinder ......... G02B 6/3863

OTHER PUBLICATIONS

Mark Grag, Active Core Alignment (ACA) process and evolution, Publication date: year 2012.*
Mark Graf, et al., "Active Core Alignment (ACA) process and evolution", 2012, pp. 1-3, Diamond SA, retrieved from Internet <www.diamond-fo.com> on Nov. 3, 2020.
"Low-Insertion-Loss Single Mode Patch Cables", Webpage <Thorlabs.com>, 11 pages, retrieved from Internet Thorlabs.com <https://www.thorlabs.com/newgrouppage9_pf.cfm?guide=10&category_id=151&objectgroup_id=6998> on Nov. 3, 2020.

* cited by examiner

*Primary Examiner* — Vishal I Patel
(74) *Attorney, Agent, or Firm* — Canon U.S.A., Inc. IP Division

(57) ABSTRACT

An apparatus for concentric alignment of cylindrical components includes an object having at least one outside cylindrical surface and at least one alignment target; an inner aligning component having at least one outside cylindrical surface having an axis and at least one inside cylindrical bore having an axis parallel with the axis of the outside cylindrical surface; an outer aligning component having at least one outside cylindrical surface having an axis and at least one inside cylindrical bore having an axis parallel with the axis of the outside cylindrical surface, wherein the at least one cylindrical surface of the object is adapted to fit rotatably into the at least one inside cylindrical bore of the inner aligning component, and the at least one outside cylindrical surface of the inner aligning component is adapted to fit rotatably into the at least one inside.

11 Claims, 7 Drawing Sheets

AFTER ALIGNMENT

APPARATUS, METHOD AND STORAGE MEDIUM FOR CONCENTRIC ALIGNMENT OF CYLINDRICAL COMPONENTS

CROSS REFERENCE TO RELATED APPLICATIONS

The present application claims the benefit of priority from U.S. Provisional Patent Application No. 62/936,275 filed Nov. 15, 2019, which is hereby incorporated by reference herein in its entirety.

BACKGROUND

Field of the Disclosure

The present disclosure generally relates to cylindrical component configurations for optical fibers and, more particularly, to an apparatus, method and storage medium for concentric alignment of cylindrical components.

Description of the Related Art

The use of optical fibers grows in many industrial, communication, and medical applications. A fiber optic link generally has components including, for example, an optical transmitter, an optical fiber or cable, connectors, an optical receiver, or the like. The transmitter may convert electrical signals to optical and may contain a light source including, for example, a light emitting diode (LED), a laser diode, or the like. An optical fiber may be made of three concentric layers including, for example, the core, cladding, coating, or the like. The core may be the light transmitting region of the fiber. The cladding may be the first layer around the core and may create an optical waveguide to confine the light in the core by total internal reflection at the core-cladding interface. The coating may be a non-optical layer around the cladding and may be stripped off when the fiber is connected. Single or multimode fiber optic configurations may be used in fiber optic communications, depending on the application. Light may travel through the fiber following different light paths in a multimode fiber optic configuration. In a single mode fiber optic configuration, only one mode is sent straight through the fiber.

Fiber optic links may be connected between the transmitter to the fiber optic cable and the fiber optic cable to the receiver. Connectors mechanically connect two optical fibers, allowing the light to transmit from the core of one fiber into the other, or to link to fiber optic equipment. Accurate alignment of these connections is key to achieving low loss fiber-to-fiber signal transmission. It is difficult to precisely center the optical fiber core relative to the ferrule outside diameter for low loss fiber-to-fiber signal transmission.

It would be beneficial to overcome these concerns and facilitate precision centering of the fiber core relative to the ferrule outside diameter to achieve low loss fiber-to-fiber signal transmission.

SUMMARY

According to an aspect of the present disclosure, an apparatus for concentric alignment of cylindrical components includes an object having at least one outside cylindrical surface and at least one alignment target; an inner aligning component having at least one outside cylindrical surface having an axis and at least one inside cylindrical bore having an axis parallel with the axis of the outside cylindrical surface; an outer aligning component having at least one outside cylindrical surface having an axis and at least one inside cylindrical bore having an axis parallel with the axis of the outside cylindrical surface, wherein the at least one cylindrical surface of the object is adapted to fit rotatably into the at least one inside cylindrical bore of the inner aligning component, and the at least one outside cylindrical surface of the inner aligning component is adapted to fit rotatably into the at least one inside cylindrical bore of the outer aligning component.

Further features of the present disclosure will become apparent from the following description of exemplary embodiments with reference to the attached drawings.

DESCRIPTION OF THE EMBODIMENTS

Various exemplary embodiments, features, and aspects of the disclosure will be described with reference to the drawings.

In the following embodiments, cylindrical component configurations for optical fibers are described that may have different characteristics, advantages, disadvantages, performance parameters, or the like. The present disclosure is not limited to any particular configuration.

Figure 1:
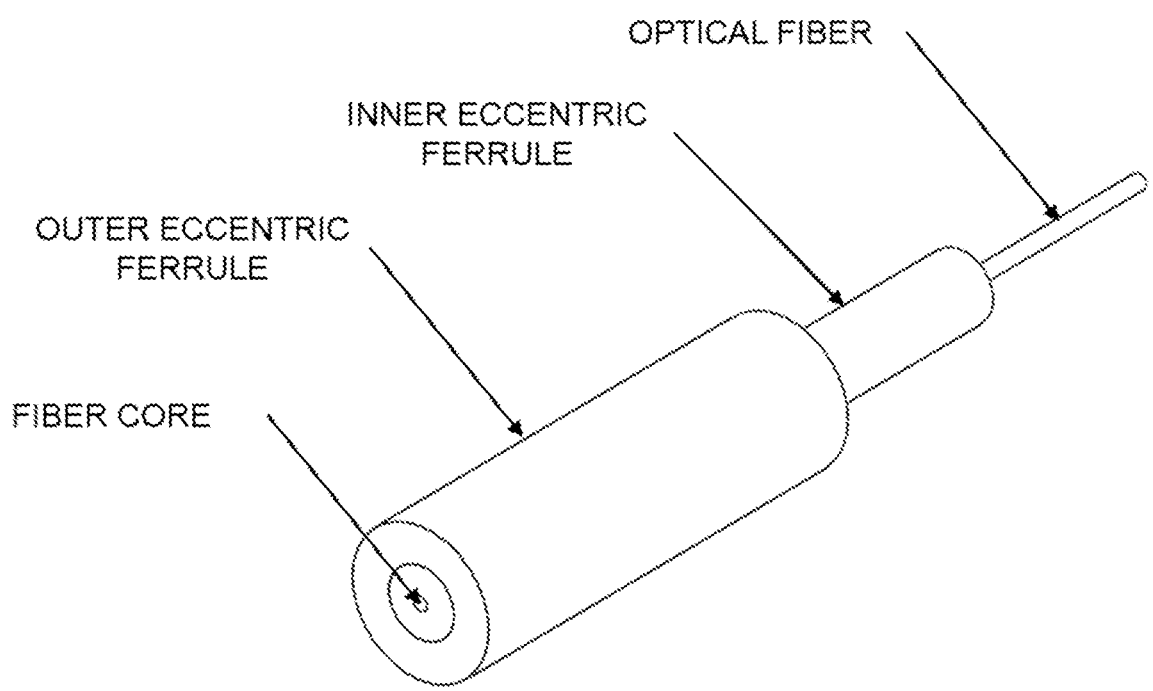
FIG. 1 illustrates an elevated view of an assembly according to an exemplary embodiment.

FIG. 1 illustrates an apparatus for concentric alignment of cylindrical components according to an exemplary embodiment. The apparatus may include an object having at least one outside cylindrical surface and at least one alignment target. An inner aligning component may have at least one outside cylindrical surface having an axis and at least one inside cylindrical bore having an axis parallel, but not essentially coincident (eccentric) with the axis of the outside cylindrical surface. An outer aligning component may have at least one outside cylindrical surface having an axis and at least one inside cylindrical bore having an axis parallel, but not essentially coincident (eccentric) with the axis of the outside cylindrical surface. The at least one cylindrical surface of the object may be adapted to fit rotatably into the at least one inside cylindrical bore of the inner aligning component. The at least one outside cylindrical surface of the inner aligning component may be adapted to fit rotatably into the at least one inside cylindrical bore of the outer aligning component.

The apparatus may include an optical imaging apparatus or system adapted to produce an image of the components in their relative position, and a calculator adapted to analyze the image and output values or rotational angle to reach alignment. The axis of the outside cylindrical surface may not be coincident (eccentric) with the axis of the at least one inside cylindrical bore. Both the inner and the outer aligning components may be cylinders with eccentric bores. The object may be an optical fiber, and the alignment target may be a fiber core. Both the inner and the outer aligning components may be cylindrical ferrules with eccentric bores. The fiber and the ferrules may be adapted to be held together by an adhesive after alignment.

As described above, the apparatus of FIG. 1 includes two nested eccentric ferrules, outer and inner, and a stripped end of optical fiber. The stripped end of the fiber may be installed into the bore of the inner eccentric ferrule. The inner bore of each ferrule may be eccentric to its respective outer diameter. The bore of the outer ferrule may be configured to accept the inner ferrule with a minimal clearance gap. Furthermore, the bore of the inner ferrule may be configured to accept the stripped end of optical fiber with a minimal clearance gap. Before the start of alignment all three parts may be assembled together as shown in FIG. 1 and both gaps may be filled with material such as glue or the like to adhere them together.

Figure 2:
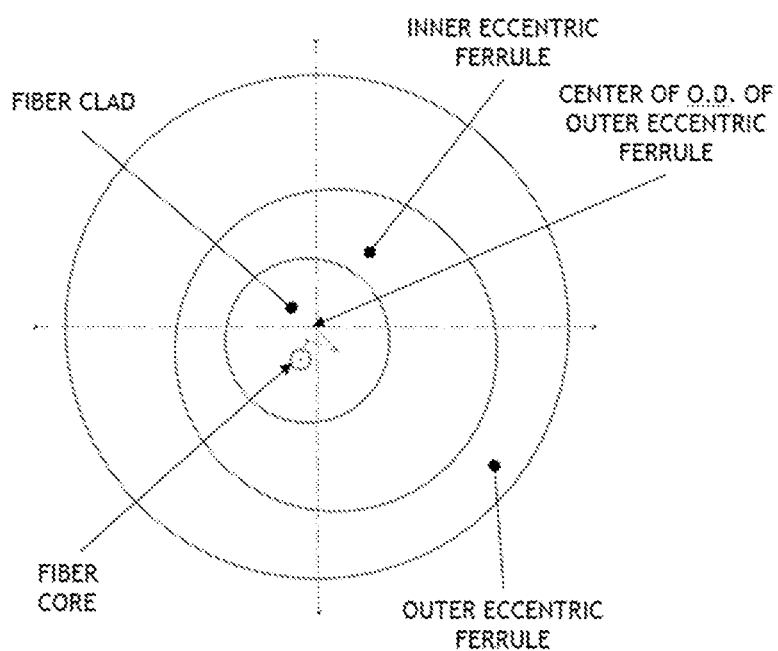
FIG. 2 illustrates a front view of an assembly according to an exemplary embodiment.
Figure 3:
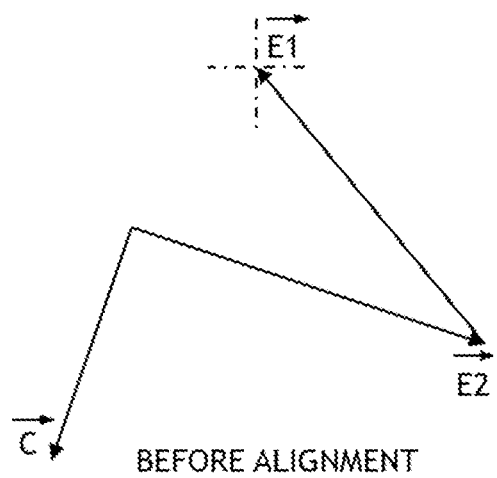
FIG. 3 illustrates a vector representation of an assembly before alignment according to an exemplary embodiment.

To align the fiber core the apparatus of FIG. 1 may be clamped by the outside surface of the outer ferrule in a stationary fixture. An image device such as a microscope, a camera, or the like, may be used to generate imagery of the front side of the assembly to determine exact or detailed positional configurations of the fiber core relative to the outside cylinder of the outer ferrule. FIG. 2 illustrates a representative image of the front side of the assembly, though eccentricities of the ferrules and of the fiber core may be exaggerated in the picture for clarity. From this image, FIG. 3 shows how a simple geometrical model may be constructed by assigning vector values such as E1, E2, and C to each measured eccentricity. Consider that E1 is a vector to the center of the outside surface of the outer ferrule from the center of the bore of the outer ferrule. Consider that E2 is a vector to the center of the outside surface of the inner ferrule from the center of the bore of the inner ferrule. Consider that C is a vector from the center of the outside surface of the stripped fiber to the center of the core of the fiber.

Figure 4:
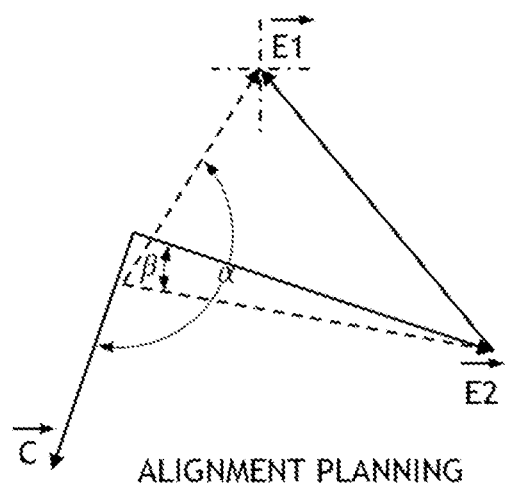
FIG. 4 illustrates a vector representation of an assembly for alignment planning according to an exemplary embodiment.
Figure 5:
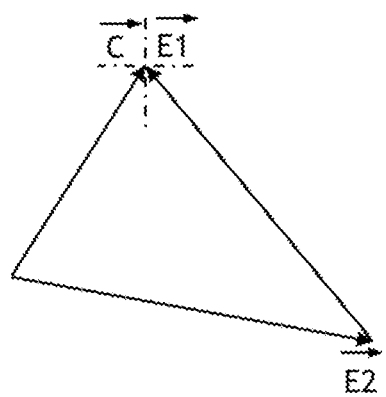
FIG. 5 illustrates a vector representation of an assembly after alignment according to an exemplary embodiment.

It may be easily seen that the goal of alignment is to bring the end of vector C to coincide with the end of vector E1. Since the lengths of these three vectors corresponding to component eccentricities do not need to be altered in the alignment process any person skilled in the art may be able to calculate from the geometrical conditions the rotation angle α and β for the fiber and the inner ferrule correspondingly to bring the assembly to aligned state. FIG. 4 illustrates the vector representation of the assembly for alignment planning, and FIG. 5 illustrates the vector representation of the assembly after alignment. Rotating at least these two of the three components relative to each other may bring the fiber core exactly to the axis of the outside cylinder of the outer ferrule.

As may be seen from FIG. 5 in aligned state C=E1+E2. This means that as long as both ferrules have equal eccentricity any fiber core misalignment smaller than the ferrules eccentricity may be corrected. Actual mismatch of the ferrules' eccentricities may determine the final fiber core centering accuracy.

The inner eccentric ferrule may be longer than the outer eccentric ferrule and the fiber may be longer than the inner eccentric ferrule so that there is a physical access to both the inner eccentric ferrule and the fiber for rotational manipulations.

During the alignment a capillary effect from adhesive such as liquid glue inside both gaps may ensure that gaps are even and the alignment is accurate. To ensure the capillary effect is not overcome by external forces all physical holding of both the inner eccentric ferrule and the fiber may be released and alignment rechecked and readjusted as desired before the completion of procedure. Both the inner and the outer aligning components may be cylinders with eccentric bores.

After alignment the adhesive filling both cylindrical gaps may be cured and the entire assembly of the two ferrules and the fiber may be polished on one end.

For ease of manufacturing the eccentric ferrules may be constructed of two or more shorter sections joined together. That may allow to use precision laser cutting for making each section.

Figure 6:
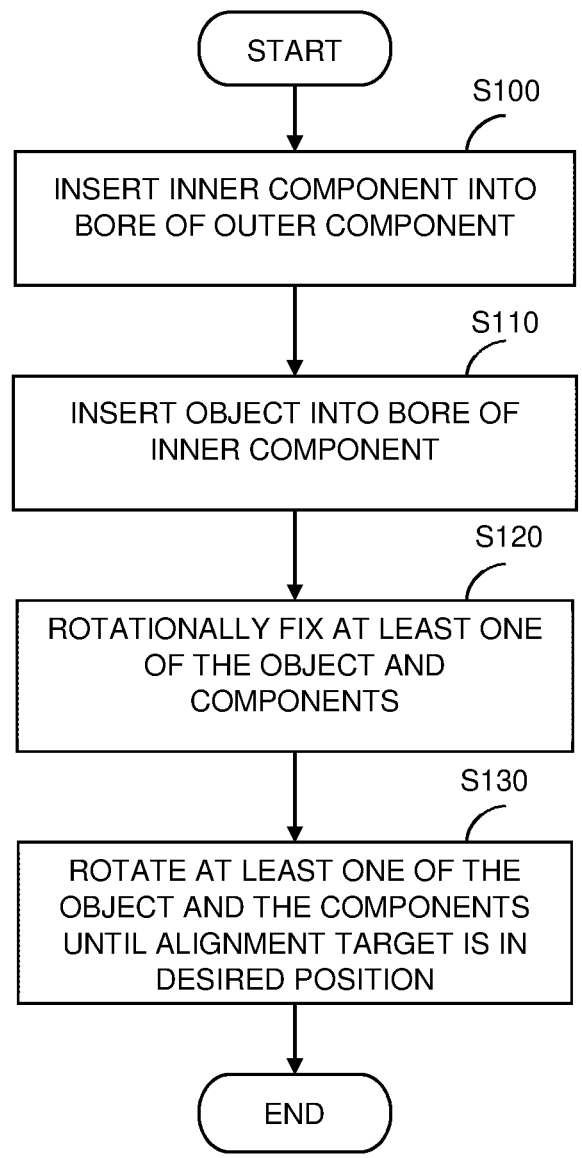
FIG. 6 illustrates assembly method steps according to an exemplary embodiment.

FIG. 6 illustrates a flow chart of a method that is described below of aligning an alignment target of an object having an outside cylindrical surface to an outer cylindrical surface of an outer aligning component.

An inner aligning component may be inserted into an eccentric bore of the outer aligning component in S100. The object may be inserted into an eccentric bore of the inner aligning component in S110. At least one of the object and the two alignment components may be rotationally fixed in S120. In S130, at least one of the object and the two alignment components may be rotated until the alignment target is in desired aligned position relative to the outer cylindrical surface of the outer aligning component.

Figure 7:
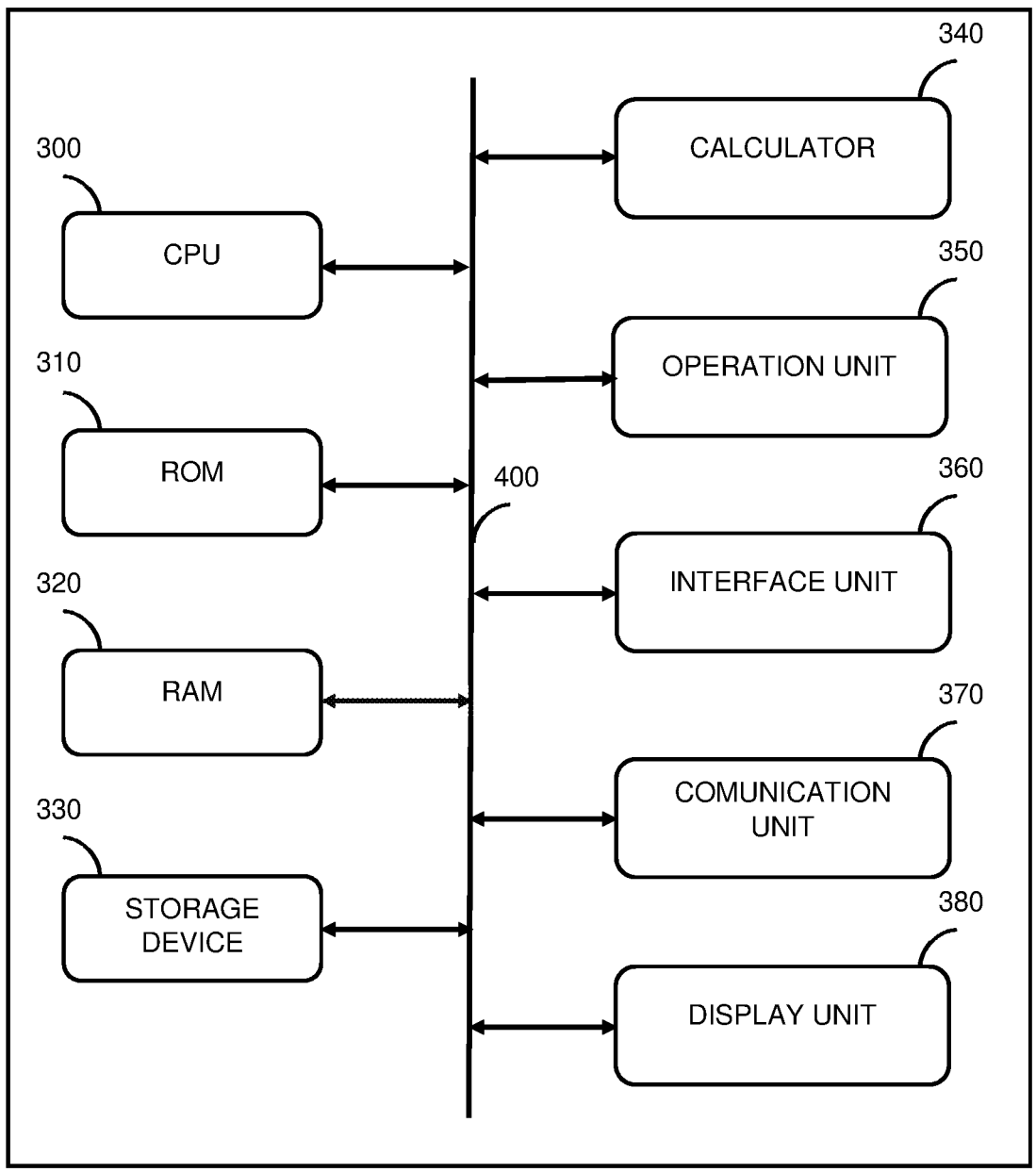
FIG. 7 illustrates a block diagram of an optical imaging apparatus or system according to an exemplary embodiment.

FIG. 7 illustrates a block diagram of an optical imaging apparatus or system adapted to facilitate precision centering of the fiber core relative to the ferrule outside diameter to achieve low loss fiber-to-fiber signal transmission, and produce an image of the components in their relative position. The optical imaging system includes one or more of a CPU (central processing unit) 300, a ROM (read-only memory) 310, a RAM (random access memory) 320, a storage device 330, an image processing unit 340, an operation unit 350, an interface unit 360, a communication unit 370, and a display unit 380. The CPU 300, which includes one or more processors, one or more memories, circuitry, or a combination thereof, processes image data and comprehensively controls access to various kinds of devices, which are connected through a system bus 400, in accordance with a control program stored in the ROM 310 or on the storage device 330. The ROM 310 stores a control program and the like that are able to be executed by the CPU 300. The RAM 320 functions as a main memory, a work area, and the like of the CPU 300 and is configured to have a memory capacity that is able to be expanded by using an optional RAM connected to an expansion port (not illustrated). The storage device 330 can be configured as an HDD (hard disk drive), an SD (secure digital) card, a flash memory, or the like, that stores a boot program, various kinds of applications, font data, a user file, an edit file, and the like. The storage device 330 can also be configured as an external storage device. The calculator 340 analyzes the image and output values or rotational angle to reach alignment. The operation unit 350 includes one or more keys, buttons, switches, a mouse, a keyboard, or the like, to perform display control of the display unit 380 and control of input of various kinds of setting information set by an input unit, and to provide inputs to the optical imaging system or apparatus. The interface unit 360 receives information for imaging control from the optical imaging apparatus or system. The communication unit 370 facilitates communication into and out of the optical imaging system or apparatus. The display unit

380 presents a display to a user to view images, data or other information, and can be configured as an LCD (liquid crystal display) or other type of display.

Additional features or aspects of present disclosure can also advantageously implement one or more AI (artificial intelligence) or machine learning algorithms, processes, techniques, or the like, to produce an image of the components in their relative position and analyze the image and output values or rotational angle to reach alignment as described above or otherwise contribute to facilitate precision centering of the fiber core relative to the ferrule outside diameter to achieve low loss fiber-to-fiber signal transmission. Such AI techniques use a neural network, a random forest algorithm, a cognitive computing system, a rules-based engine, or the like, and are trained based on a set of data to assess types of data and generate output. For example, a training algorithm can be configured to facilitate precision centering of the fiber core relative to the ferrule outside diameter using one or more models or through analysis of positional configuration data sets of the fiber core relative to the outside cylinder of the outer ferrule. The model(s) can be configured as software that takes images as input and returns predictions for the given images as output. The model(s) can be an instance of a model architecture (set of parameter values) that has been obtained by model training and selection using a machine learning and/or optimization algorithm/process. A model can generally include, for example, an architecture defined by a source code (e.g. a convolutional neural network including layers of parameterized convolutional kernels and activation functions, or the like) and configuration values (parameters, weights, features, or the like) that are initially set to random values and are then over the course of the training iteratively optimized given data example, an objective function (loss function), an optimization algorithm (optimizer), or the like.

At least some of the image and output values or rotational angles and detailed positional configurations of the fiber core relative to the outside cylinder of the outer ferrule can be used as input data and provided to the training algorithm. Initial image and output values or rotational angle and detailed positional configurations of the fiber core relative to the outside cylinder of the outer ferrule data sets can be stored in a database to facilitate precision centering of the fiber core relative to the ferrule outside diameter that are generated using input mapping to the model(s) or through expert research, and machine learning can find parameters for AI processes. Initial image and output values or rotational angle, or positional configurations of the fiber core relative to the outside cylinder of the outer ferrule data from the initial data sets are used or placed into an AI process or algorithm to facilitate precision centering of the fiber core relative to the ferrule outside diameter for new data. The training algorithm is configured to learn physical relationships in the input data to best describe these relationships or correlations. The data sets include information based on a number of factors including, for example, the acquired images, the number of acquired images, the angle of the image, the position of the image, detailed positional configurations of the fiber core relative to the outside cylinder of the outer ferrule, or the like. The data is evaluated using a weighted evaluation where the weights are learned through a training process, through subject matter specifications, or the like. Deep learning mechanisms can augment an AI process to identify indicators in the image data that can include, for example, image and output values or rotational angle, positional configurations of the fiber core relative to the outside cylinder of the outer ferrule, or the like.

The method may further include providing an optical imaging system adapted to produce an image of the components in their relative position. The method may further include providing a calculator adapted to analyze the image and output values or rotational angle to reach alignment. The axis of the outside cylindrical surface may not be coincident (eccentric) with the axis of the at least one inside cylindrical bore. Both the inner and the outer aligning components may be cylinders with eccentric bores. The object may be an optical fiber. The alignment target may be a fiber core. Both the inner and the outer aligning components may be cylindrical ferrules with eccentric bores. The fiber and the ferrules may be adapted to be held together by an adhesive after alignment. The adhesive may be glue.

A storage medium storing a program may be configured to cause a computer to execute the method of aligning an alignment target of an object having an outside cylindrical surface to an outer cylindrical surface of an outer aligning component.

Features of the present disclosure facilitate precision centering of the fiber core relative to the ferrule outside diameter to achieve low loss fiber-to-fiber signal transmission.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU), or the like), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus for concentric alignment of cylindrical components comprising:

an object having at least one outside cylindrical surface and at least one alignment target;

an inner aligning component having at least one outside cylindrical surface having an axis and at least one inside cylindrical bore having an axis parallel, but not coincident (eccentric), with the axis of the outside cylindrical surface;

an outer aligning component having at least one outside cylindrical surface having an axis and at least one inside cylindrical bore having an axis parallel, but not coincident (eccentric), with the axis of the outside cylindrical surface, wherein the at least one cylindrical surface of the object is adapted to fit rotatably into the at least one inside cylindrical bore of the inner aligning component, the at least one outside cylindrical surface of the inner aligning component is adapted to fit rotatably into the at least one inside cylindrical bore of the outer aligning component, and the alignment target is oriented in an aligned position relative to the outside cylindrical surface of the outer aligning component by rotating at least one of the object, the inner aligning component, and the outer aligning component.

2. The apparatus according to claim 1, further comprising an optical imaging system adapted to produce an image of the components in their relative position.

3. The apparatus according to claim 2, wherein the optical imaging system is configured to facilitate concentric alignment of cylindrical components using artificial intelligence or machine learning.

4. The apparatus according to claim 3, wherein the artificial intelligence or machine learning is iterative.

5. The apparatus according to claim 2, further comprising a calculator adapted to analyze the image and output values or rotational angle to reach alignment.

6. The apparatus according to claim 1, wherein both the inner and the outer aligning components are cylinders with eccentric bores.

7. The apparatus according to claim 1, wherein the object is an optical fiber.

8. The apparatus according to claim 7, wherein the alignment target is a fiber core.

9. The apparatus according to claim 7, wherein both the inner and the outer aligning components are cylindrical ferrules with eccentric bores.

10. The apparatus according to claim 9, wherein the fiber and the ferrules are adapted to be held together by an adhesive after alignment.

11. The apparatus according to claim 10, wherein the adhesive is glue.

* * * * *